Dec. 30, 1924.
W. M. BRADSHAW ET AL
1,521,003
CONTROL SYSTEM
Filed July 20, 1922
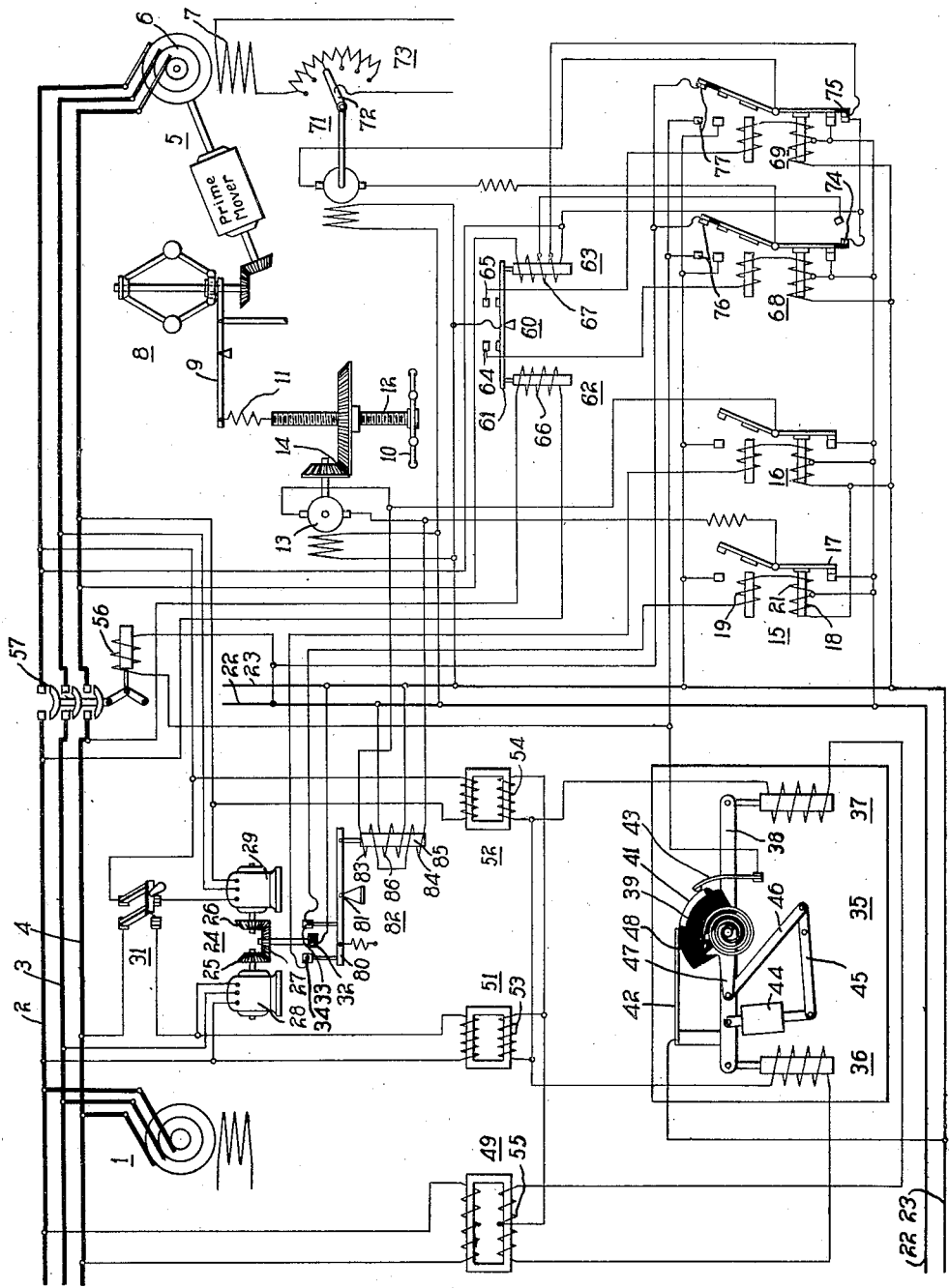
WITNESSES:
INVENTORS.
William M. Bradshaw and
John H. Ashbaugh
BY
ATTORNEY

Patented Dec. 30, 1924.

1,521,003

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

Application filed July 20, 1922. Serial No. 576,241.

*To all whom it may concern:*

Be it known that we, WILLIAM M. BRADSHAW, a citizen of the United States, and a resident of Wilkinsburg, in the county of Allegheny and State of Pennsylvania, and JOHN H. ASHBAUGH, a citizen of the United States, and a resident of Wilkinsburg, in the county of Allegheny and State of Pennsylvania, have invented a new and useful Improvement in Control Systems, of which the following is a specification.

Our invention relates to a system of control for a plurality of dynamo-electric machines and it has special relation to combined governing and regulating means therefor.

One object of our invention is to provide a system of the above-indicated character that shall be responsive to certain electrical characteristics of each of said machines to "parallel" said machines when such operating characteristics of each correspond.

Another object of our invention is to provide a system of the above-indicated character that shall be responsive to the phase relationship of the currents of the respective machines and to the speeds and the voltages thereof.

A still further object of our invention is to provide a system of the above indicated character that shall govern the operation of one of the machines in accordance with the operation of another of said machines.

In a system wherein there are one or more dynamo-electric machines connected to a power circuit and it is desired to couple an additional machine to said circuit, it becomes highly important to withhold the actual connection of the additional machine to the power circuit until the electrical conditions thereof correspond to or match the electrical conditions of the power circuit and the operating characteristics of the machines already connected thereto.

Thus, in operating a plurality of generating stations, an increase in load may require the addition of an auxiliary generating station to supply part of the load. The machine in the auxiliary generating station should not be connected to the line before it has attained a proper speed and not until the current thereof is in phase coincidence with the current of the power circuit and the voltage thereof is substantially the voltage of the line. Accordingly, the operation of the auxiliary station must be regulated to automatically bring about the desired operations in order to prevent harmful effects upon the power circuit and the machines connected thereto.

The present invention contemplates preventing the premature coupling of the auxiliary generator to the power circuit by providing a mechanical differential, the opposite sides of which are controlled by synchronous motors operating respectively from the power circuit and the circuit of the auxiliary generator, an automatic synchronizer operating in accordance with the phase indications of the respective circuits, and a voltage-balancing regulator operated in accordance with the voltage indications of the respective circuits. These mechanisms control the operation of the auxiliary generator and the energizing circuit for the circuit-breaker for coupling the auxiliary generator to the power circuit.

After the generator is connected to the circuit, its governor mechanism may be adjusted so that the generator will take the desired portion of the load.

Our invention will be best understood from the accompanying drawing, wherein the single figure is a diagrammatic illustration of the circuits and apparatus embodying our invention.

A generator 1, which will be hereinafter referred to as the main generator, is connected to a power circuit comprising conductors 2, 3 and 4. An auxiliary generator 5, having an armature 6 and a field-magnet winding 7, is adapted to be operated by a prime mover (not shown) such as a water-wheel. The prime mover may be controlled by any standard governor mechanism such as fly-ball governor 8. The governor 8 works upon a pivoted shaft 9, against the tension of a spring 11, which is adjustable by means of a screw 12. The screw 12 is operated by means of a motor 13 through gearing 14. It may also be operated by means of a hand-wheel 10.

The direction of rotation of the motor 13 is controlled by reversing switches 15 and 16. The reversing switches respectively comprise a switch arm 17, a permanently energized holding coil 18, an operating coil 19 and a neutralizing coil 21. The coils may be energized from control bus bars 22 and 23. Normally, the holding coils 18 retain the arms 17 in the illustrated position, thus short-circuiting the armature of motor 13 for purposes of dynamic braking.

In accordance with our invention, a differential mechanism 24 is provided for obtaining an indication of the relative speeds of the generators 1 and 5. The differential mechanism 24 comprises a pair of bevel gear-wheels 25 and 26, co-operating to actuate intermediate gear-wheel 27. The gear-wheel 25 is operated by means of a synchronous motor 28 that is connected to the power circuit 2, 3 and 4. The gear-wheel 26 is operated by a synchronous motor 29 that is connected in circuit with the auxiliary generator 5. The circuits of the respective synchronous motors extend through a two-pole, single-throw knife switch 31. It will be understood that the knife switch 31 is symbolical of any manual or automatic means for controlling the operation of the synchronous motors, which operation is concurrent with the starting of the auxiliary generator 5.

The differential mechanism 24 controls the movements of contact member 32 to cause it to selectively engage contact members 33 and 34, which are respectively included in circuit with the operating coils of the reversing switches 15 and 16.

The contact members 33 and 34 are mounted upon a lever arm 80, which is pivoted at 81 and has connected to it, on the opposite side of the pivot, an electromagnet 82. The electromagnet 82 comprises two differentially wound coils 83 and 84 that are respectively disposed upon the upper and the lower ends of a core member 85. There is centrally disposed upon the core member a coil 86, which is connected across the control bus bars 22 and 23, so as to polarize the electromagnet 82. The coils 83 and 84 are in circuit with the reversible governor motor 13 so as to be energized in one direction or the other, by the counter-electromotive force of the motor 13. The differentially wound coils 83 and 84 cooperate with the constantly energized polarizing coil 86 to cause the point of maximum flux density to shift in one direction or the other from the center of the three coils, depending upon which of the coils 83 or 84 produce flux in the same direction as the coil 86, and which of the differential coils produce flux in the opposite direction. That is to say, the direction of the shifting of the maximum flux density will depend upon the direction of current flow through the coils 83 and 84, which also depends upon the direction of rotation of the motor 13. The movement will be in a direction to separate the contact members earlier than they would be normally separated, thereby anticipating the change in speed of the incoming generator and rendering the action of this mechanism "dead beat," thus preventing hunting action.

When the differential is set in operation, the contact member 32 will engage the contact member 33 to actuate the reversing switch 15 and operate the motor 13, to thereby raise the setting of the governor mechanism 8. The tendency will be to cause the speed to exceed normal speed by reason of the inertia of the prime mover, thus causing the actuation of the opposite switch and operation of the motor 13 in the other direction. The action of the apparatus is rendered "dead beat" by the electromagnet 82: As the speed of the generator 5 gradually approaches the predetermined normal speed, the electromagnet 82 will cause the separation of the contact members 33 and 34 from contact member 32 just prior to the obtaining of the normal condition, thereby preventing hunting action of the governor motor 13.

While the differential mechanism is functioning to govern the speed of the auxiliary set, an automatic synchronizer 35 may be set into operation to govern the energization of the main circuit-breaker that is to couple the generators together. The synchronizer 35 may be of any desired construction, the drawings herein diagrammatically illustrating the synchronizer shown in detail in patent to H. J. McMahan, No. 819,787, issued May 8, 1906, and assigned to the Westinghouse Electric & Manufacturing Company.

The illustrated synchronizer embodies a pair of electromagnets 36 and 27, the cores of which are connected to a pivoted lever 38. A segment 39, which carries a contact strip 41, is also mounted upon the pivot for the lever 38. A pair of brushes 42 and 43 are adapted to engage with the contact strip 41, as hereinafter described. The segment 39 is adapted to be rocked through a dash-pot connection 44 with the lever 38, and an intermediate pivoted lever 45, line 46 and forked member 47. The fork engages with a pin 48.

The solenoids 36 and 37 are energized by means of a transformer 49, the primary winding of which is connected across the power circuit, a transformer 51, the primary winding of which is also connected across the power circuit, and a transformer 52, the primary winding of which is connected across the auxiliary generator terminals. The secondary windings 53 and 54 of the transformers 51 and 52 are connected in parallel relation, one terminal thereof being connected to the center point of the secondary 55 of transformer 49, and the other terminal thereof being connected to the electromagnets 36 and 37. Electromagnet 36 is connected to one of the outer terminals of the secondary winding 55, while the electromagnet 37 is connected to the other outer terminal of the secondary winding 55.

So long as the periodicity of the current of generator 5 is different from that of the current of the power circuit, the current induced in the secondary winding 54 of the transformer 52 will traverse the two halves of the secondary winding 55 in opposite directions and will also traverse both of the electromagnets 36 and 37. Since the last-named current is not in phase with that induced in the secondary winding 55 by current derived from the power circuit, there will be substantial equality in the pulls exerted by the two electromagnets until the frequency of the current delivered by the generator 5 becomes approximately the same as that of the power circuit.

When this condition obtains the current from the other transformers that is in the half of the secondary winding 55 that is connected to the electromagnet 36 will oppose that induced in this portion of the secondary winding by the primary winding of the transformer. Also the current supplied from the other transformers to the other half of the winding 55 will be added to that induced therein. Consequently, the electromagnet 37 will be so energized as to exert a pull in excess of that of the electromagnet 36 and will thus serve to so rock the bar 38 as to move the brush 42 into engagement with the contact strip 41, thus completing the circuit therethrough. This circuit extends to the energizing circuit of the coil 56 of the circuit-breaker 57 that is adapted to couple the auxiliary generator 5 in parallel relation to the main generator 1.

If the approach to synchronism is gradual, the segment 39 will not be appreciably moved, by reason of the dashpot connection between the lever 38 and the segment 39. If, however, the approach to synchronism is rapid, the lever 38 will be rocked so rapidly that the dashpot connection will not be sufficient to absorb the movement and, hence, the segment will be moved in the opposite direction from the direction of the movement of the brush 42. This operation will close the circuit to the coil 56 more quickly than if the brush 42 alone was moved.

The time element in the operation of the synchronizer is important, since it permits the closing of the circuit-breaker at the precise moment synchronism occurs, regardless of the speed at which synchronism is reached.

Obviously, damage would occur if the circuit-breaker closed prior to the time the voltage of the auxiliary generator balanced with that of the power circuit 2, 3, 4. Hence, a regulator 60 is provided, which comprises a pivoted beam 61, having electromagnets 62 and 63, respectively located on opposite sides of the pivot, and contact members 64 and 65 that are also located on opposite sides of the pivot of said beam. The electromagnet 62 has an energizing coil 66 that is connected across the power circuit 2, 3, 4. The electromagnet 63 has an energizing coil 67 that is connected across the circuit of the auxiliary generator. The contact members 64 and 65 respectively control the circuits to the operating coils of reversing switches 68 and 69, which are similar in construction and operation to reversing switches 15 and 16, heretofore described. The reversing switches control the operation of a motor 71 that is connected to the arm 72 of a rheostat 73, which is located in the circuit of the field-magnet winding 7 of the auxiliary generator.

When the operation of the auxiliary generator is begun, its voltage is below that of the voltage of the power circuit. Accordingly, the contact members 64 will be in engagement to complete the circuit to reversing switch 68, thereby operating the rheostat arm 72 to decrease the resistance in the circuit of the field-magnet winding 7 of the auxiliary generator. Simultaneously, the reversing switch 68 operates auxiliary contact members 74 to short-circuit a section of the coil 67 of the electromagnet 63 for the purpose of preventing hunting action. As the voltage of the generator 5 builds up, the regulator will be overbalanced in the opposite direction, so that contact members 65 will be closed to energize the reversing switch 69 and thereby weaken the excitation of the field-magnet winding 7 of the auxiliary generator. Simultaneously with the operation of the reversing switch 69, the auxiliary contact members 75 will be opened to insert in circuit a portion of the coil 67 for the purpose of preventing hunting action.

In order that the circuit-breaker 57 may not be closed before the voltages of the machines 1 and 5 coincide, the reversing switches 68 and 69 are provided with a set of auxiliary contact members 76 and 77, respectively. The contact members 76 and 77 are connected in parallel relation across the circuit to the coil 56 of the circuit-breaker. Thus, if either of the reversing switches 68 or 69 is closed, the coil 56 of the circuit-breaker is short-circuited, thereby preventing the premature operation of the circuit-breaker by the synchronizer. That is, the circuit-breaker cannot operate until the voltages of the two machines are substantially alike.

When it becomes desirable to connect the auxiliary generating station 5 to the power circuit 2, 3, 4, the station is started in the usual manner. Simultaneously therewith the control device 31 is operated to complete the respective circuits to the synchronous motors 28 and 29 of the differential mechanism 24. It will be understood that the generator 1 is operating at a particular speed dependent upon the load carried thereby.

As the voltage of the auxiliary generator 5 is building up, its speed and the frequency of its current are considerably below those of the generator 1, rendering it undesirable to couple the generators in parallel relation. The difference in speed between the generators is indicated by the differential mechanism 24. Thus, the contact member 32 will be caused to engage one of the contact members 33 or 34. The difference in frequency or phase relations of the currents is indicated by the synchronizer 35.

Concurrently with the operation of the differential mechanism 24, the operation of the synchronizer 35 is initiated. The differential mechanism controls the operation of the reversing switches for the governor motor, while the synchronizer controls the circuit to the coil 56 of the circuit-breaker. The voltage-balancing element 60 will short-circuit the energizing current for the coil 56 in the event the voltage of the generator 5 is too high or too low. Upon the energization of the coil 56, the circuit-breaker 57 will be operated to couple the generator 5 to the power circuit 2, 3, 4 and in parallel relation to the generator 1.

The governor mechanism 8 of the prime mover for the auxiliary generator 5 has a predetermined setting so that the generator 5 will have normal operating characteristics from no-load to full-load, with a corresponding position of the controlling valve of the prime mover. However, at the time that the generator 5 is paralleled with the generator 1, the phase relation of the respective currents exactly coincide, and also the respective speeds and the respective voltages substantially coincide. It will be appreciated that varying conditions will cause the coupling of the generator 5 in parallel relation to the generator 1 at varying current frequencies and machine speeds. Likewise, the motor 13 will have been operated to change the setting of the governor 8 to correspond to the speed at which the generators have been synchronized. The synchronizer 35 and voltage balancer 60 will function to regulate the auxiliary generator 5 to properly synchronize it.

The proportion of load thereafter taken by the generator 5 may be determined by readjusting the setting of the governor mechanism 8 by operating the hand wheel 10.

In summary, it may be briefly pointed out that we have provided means for regulating the speed of the auxiliary generator 5 in accordance with the speed of the generator 1, the tendency of this mechanism being to bring the speed of the prime mover of the generator 5 to substantially that of the prime mover for the generator 1. There is also provided an automatic synchronizer that is not effective to complete the circuit therethrough until the currents of the respective circuits are in proper phase relation. The synchronizer directly controls the actuation of the circuit-breaker 57. There is also provided a voltage-balancing regulator that controls the field strength of the auxiliary generator 5 to quickly render the voltage of the generator 5 equal to that of the power circuit. This mechanism also controls the energizing circuit of the circuit-breaker 57 and prevents its operation until the voltages of the respective circuits coincide.

Modifications in the system and arrangement and location of parts may be made within the spirit and scope of our invention, and such modifications are intended to be covered by the appended claims.

We claim as our invention:—

1. The combination with a power circuit, a dynamo-electric machine, and switching means for connecting said machine to the power circuit, of control means for said machine comprising a differential mechanism governed from said power circuit and said dynamo-electric machine, and synchronizing means adapted to control the energizing circuit for said switching means.

2. The combination with a power circuit, a dynamo-electric machine, a prime mover and a governor therefor, of control means for said governor comprising a differential mechanism governed from said power circuit and said dynamo-electric machine, switching means for connecting said machine to the power circuit, synchronizing means adapted to control the energizing circuit for said switching means, and apparatus governed in accordance with the voltages of the power circuit and of the dynamo-electric machine adapted to also control the energizing circuit for said switching means.

3. The combination with a power circuit and a dynamo-electric machine, of means for connecting said machine to said circuit, and control means therefor operated in accordance with the speed of said machine, the phase relationship of the respective currents and the voltages of the respective circuits.

4. The combination with a power circuit and a dynamo-electric machine, of means for connecting said machine to said circuit, said means being responsive to the speed of said machine, the phase relation of the respective currents and the voltages of the respective circuits.

5. The combination with a power circuit and a dynamo-electric machine, of means for connecting said machine to said circuit, said means being responsive to the speed of said machine, the phase relation of the respective currents and the voltages of the respective circuits, and anti-hunting means co-operating therewith.

6. The combination with a power circuit and a dynamo-electric machine, of means for connecting said machine to said circuit, said means being responsive to the speed of said machine, the phase relation of the respective currents and the voltages of the respective circuits, and operating proportional to the speed at which said machine approaches a predetermined condition.

7. The combination with a power circuit and a dynamo-electric machine, of means for connecting said machine to said circuit, said means being responsive to the frequency of the respective currents and the voltages of the respective circuits, and means adapted to concurrently control the speed of said machine.

8. The combination with two disconnected machines, of means for connecting said machines together, control means therefor adapted to prevent said connection until the phase and voltage indications of said machines are substantially similar and means adapted to concurrently control the speed of one of said machines.

9. The combination with a power circuit and a dynamo-electric machine, of means for connecting said machine to said circuit, control means therefor adapted to prevent said machine being so connected until the current thereof is of a phase indication similar to that of said circuit, and until the voltage of said machine is similar to that of said circuit, and means for adjusting the speed of said machine in accordance with the coincidence of phase and voltage indications.

10. The combination with a power circuit and a dynamo-electric machine, of means for connecting said machine to said circuit, control means therefor comprising a synchronizer operated in accordance with the phase indications of the respective currents and a device responsive to the respective voltages of said circuit and said machine and adapted to control a shunt circuit for said control means.

11. The combination with a power circuit and a dynamo-electric machine, of means for connecting said machine to said circuit, control means therefor comprising a synchronizer operated in accordance with the phase indications of the respective currents, a device responsive to the respective voltages of said circuit and said machine and adapted to control a shunt circuit for said control means, and means for adjusting the speed of said machine.

12. The combination with two disconnected dynamo-electric machines, of means for connecting said machines together and control means therefor governed in accordance with the speeds of said machines and the phase relation of the respective circuits of said machines.

13. The combination with two disconnected dynamo-electric machines, of means for connecting said machines together and control means therefor governed in accordance with the speeds of said machines and the phase relation and the voltages of the respective circuits of said machines.

14. The combination with two disconnected dynamo-electric machines, of means for connecting said machines together, control means therefor governed in accordance with the phase relation and the voltages of the respective circuits of said machines, and means for adjusting the speed of one machine in accordance with the speed of the other machine.

15. The combination with two disconnected dynamo-electric machines, of means for connecting said machines together, control means therefor governed in accordance with the speeds of said machines and the phase relation and the voltages of the respective circuits of said machines, and anti-hunting means co-operating with said control means.

16. The combination with two disconnected dynamo-electric machines, of means for connecting said machines together, control means therefor governed in accordance with the phase relation and the voltages of the respective circuits of said machines, and anti-hunting means co-operating therewith.

17. The combination with two disconnected dynamo-electric machines, of means for connecting said machines together, control means therefor governed in accordance with the phase relation and the voltages of the respective circuits of said machines, and anti-hunting means co-operating therewith.

18. The combination with two disconnected dynamo-electric machines, of means for connecting said machines together, and control means therefor comprising contact mechanism governed in accordance with the balancing of the currents of the respective circuits of said machines, means for rendering the action of the contact mechanism proportional to the rate of balancing of said machines, and means for balancing the speeds of said machines.

19. The combination with a power circuit and a dynamo-electric machine, of means for connecting said machine to said circuit, and control means therefor comprising contact mechanism, means for balancing the phase relation between the currents of said circuit and said machine, and means for rendering the action of the contact mechanism proportional to the rate of completion of said balance.

20. The combination with a power circuit and a dynamo-electric machine, of means for connecting said machine to said circuit, and control means therefor comprising contact mechanism, means for balancing the phase relation between the currents of said circuit and said machine, means for rendering the action of the contact mechanism proportional to the rate of completion of said balance, and means adapted to balance the voltages of said circuit and said machine.

21. The combination with a power circuit and a dynamo-electric machine, of means for connecting said machine to said circuit and control means therefor comprising contact mechanism, means for balancing the phase relation between the currents of said circuit and said machine, means for rendering the action of the contact mechanism proportional to the rate of completion of said balance, means adapted to balance the voltages of said circuit and said machine, and anti-hunting means co-operating with said control means.

22. The combination with a power circuit and a dynamo-electric machine, of means for connecting said machine to said circuit and control means therefor comprising contact mechanism, means for balancing the phase relation between the currents of said circuit and said machine, means for rendering the action of the contact mechanism proportional to the rate of completion of said balance, means adapted to balance the voltages of said circuit and said machine, anti-hunting means co-operating therewith, and means for governing the speed of said dynamo-electric machine in accordance with an indication of said power circuit.

23. The combination with a power circuit and a dynamo-electric machine, of means for connecting said machine to said circuit and control means therefor comprising contact mechanism, means for balancing the phase relation between the currents of said circuit and said machine, means for rendering the action of the contact mechanism proportional to the rate of completion of said balance, means adapted to balance the voltages of said circuit and said machine, anti-hunting means co-operating therewith, means for governing the speed of said dynamo-electric machine in accordance with an indication of said power circuit, and anti-hunting means co-operating therewith.

24. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, a synchronizer having contact mechanism that is controlled in accordance with the phase coincidence of the respective currents of said circuit and said machine, and adapted to energize said connecting means, and means controlled in accordance with the voltages of said circuit and said machine and adapted to control a shunt circuit for said connecting means.

25. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, a portion of said contact mechanism being mounted upon a pivoted lever arm, an electromagnet carried by said arm and adapted to be energized in accordance with the counter-electromotive force of said governor motor, a synchronizer having contact mechanism that is controlled in accordance with the phase coincidence of the respective currents of said circuit and said machine, and adapted to energize said connecting means, and means controlled in accordance with the voltages of circuit and said machine and adapted to control a shunt circuit for said connecting means.

26. The combination with a power circuit, a dynamo-electric machine, a governor therefor, a motor for controlling said governor, and means for connecting said machine to said circuit, of control means comprising a differential operated by synchronous motors respectively connected to said circuit and to said machine, contact mechanism operated by said differential and adapted to control said governor motor, means co-operating with a portion of said contact mechanism and adapted to move the same proportional to the ratio of adjustments initiated by said contact mechanism, a synchronizer having contact mechanism that is controlled in accordance with the phase coincidence of the respective currents of said circuit and said machine, and adapted to energize said connecting means, and means controlled in accordance with the voltages of said circuit and said machine and adapted to control a shunt circuit for said connecting means.

27. The combination with a power circuit, a dynamo-electric machine, a prime mover therefor, and a speed governor for said prime mover, of means for connecting said machine to said circuit, and control means comprising a synchronizer controlled in accordance with the phase indications of the respective currents of said circuit and said machine, and a differential mechanism actuated in accordance with the frequencies of said circuit and said machine, for controlling the operation of said connecting means and said governor.

28. The combination with a plurality of dynamo-electric machines, a prime mover for one of said machines, a governor therefor, a motor for controlling said governor, and reversing switches for said motor, of means for coupling said machines, and control means for said coupling means and said reversing switches, said control means comprising differential mechanism, synchronous motors respectively connected to said machines for operating said differential, contact mechanism operated thereby, a synchronizer operated in accordance with the phase indications of said machines, and contact mechanism controlled thereby.

29. The combination with a power circuit and a dynamo-electric machine, of regulating means for said machine comprising differential mechanism operated from said circuit and said machine and adapted to adjust the speed of operation of said machine, contact mechanism, electroresponsive means adapted to regulate the excitation of said machine proportional to the voltage of said circuit, additional contact mechanism, electroresponsive means adapted to control the same proportional to the phase relation between said circuit and said machine, and means governed by said additional contact mechanism and adapted to connect said machine to said power circuit.

30. The combination with a plurality of dynamo-electric machines, one of which is to be put in parallel operation with the other of said machines, of means for governing the speed of the first machine and having other means for rendering the action of said speed-governing means more rapid, means for governing the voltage of the first machine and having other means co-operating therewith to render the action of said voltage-governing means more rapid, and additional means for connecting said machines together and operating in accordance with the phase indications of the circuits of said machines, all of said means co-operating to parallel said machines when the respective voltages, currents and speed substantially coincide.

31. The combination with a plurality of dynamo-electric machines adapted to be connected in parallel relation, of means for controlling such connection comprising differential mechanism operated from each of said machines, co-operating contact members controlled thereby, electroresponsive means adapted to prematurely open the contact members closed by said differential mechanism, a synchronizer operated in accordance with the phase indications of the respective machines, means adapted to render the operation of the synchronizer proportional to the approach to synchronism of said machines, a regulator comprising contact members, electroresponsive means for controlling said contact members proportional to the voltages of said machines, and means adapted to prematurely open the contact members closed by said electroresponsive means.

32. The combination with a power circuit and a dynamo-electric machine, of means for connecting said machine to said circuit, control means therefor operated in accordance with the speed of said machine, the phase relationship of the respective currents and the voltages of the respective circuits, and means for initiating the operation of said control means.

33. The combination with a power circuit and a dynamo-electric machine, of means for connecting said machine to said circuit, said means being responsive to the frequency of the respective currents and the voltages of the respective circuits, and apparatus adapted to initiate the operation of said connecting means.

34. The combination with a power circuit and a dynamo-electric machine, of means for connecting said machine to said circuit, said means being responsive to the speed of said machine, the frequency of the respective currents and the voltages of the respective circuits, and operating proportional to the speed at which said machine approaches a predetermined condition, and apparatus adapted to initiate the operation of said connecting means whenever certain characteristics of the power circuit are a predetermined degree below normal.

35. The combination with a power circuit and a dynamo-electric machine, of means for connecting said machine to said circuit, and control means therefor comprising contact mechanism, means adapted to balance the currents of said circuit and said machine, means for rendering the action of the contact mechanism proportional to the rate of completion of said balance, means adapted to balance the voltages of said circuit and said machine, and apparatus adapted to initiate the operation of said control means.

In testimony whereof, we have hereunto subscribed our names this 12th day of July, 1922.

WILLIAM M. BRADSHAW.
JOHN H. ASHBAUGH.